US008247933B2

(12) United States Patent
Dang et al.

(10) Patent No.: US 8,247,933 B2
(45) Date of Patent: Aug. 21, 2012

(54) METHODS AND APPARATUS FOR A PERMANENT MAGNET MACHINE WITH A DIRECT LIQUID COOLED STATOR

(75) Inventors: Dang Dinh Dang, Garden Grove, CA (US); Erik Hatch, Cypress, CA (US); Rolf Blissenbach, Rolling Hills Estates, CA (US); Khiet Le, Mission Viejo, CA (US); Jonathan Bird, Charlotte, NC (US)

(73) Assignee: GM Global Technology Operations LLC, Detroit, MI (US)

( * ) Notice: Subject to any disclaimer, the term of this patent is extended or adjusted under 35 U.S.C. 154(b) by 234 days.

(21) Appl. No.: 12/432,385

(22) Filed: Apr. 29, 2009

(65) Prior Publication Data
US 2010/0277016 A1 Nov. 4, 2010

(51) Int. Cl.
*H02K 9/00* (2006.01)
(52) U.S. Cl. ............................... 310/54; 310/59
(58) Field of Classification Search ............ 310/52, 310/54, 64, 57–59
See application file for complete search history.

(56) References Cited

U.S. PATENT DOCUMENTS

| | | | | | |
|---|---|---|---|---|---|
| 3,577,024 | A | * | 5/1971 | Inagaki et al. | 310/54 |
| 5,616,973 | A | * | 4/1997 | Khazanov et al. | 310/54 |
| 5,682,074 | A | * | 10/1997 | Di Pietro et al. | 310/215 |
| 6,472,780 | B2 | * | 10/2002 | Kikuchi et al. | 310/52 |
| 6,617,715 | B1 | * | 9/2003 | Harris et al. | 310/54 |
| 6,639,334 | B2 | * | 10/2003 | Chen et al. | 310/52 |
| 6,734,585 | B2 | * | 5/2004 | Tornquist et al. | 310/61 |
| 6,933,633 | B2 | * | 8/2005 | Kaneko et al. | 310/52 |
| 6,954,010 | B2 | * | 10/2005 | Rippel et al. | 310/60 A |
| 7,397,154 | B2 | * | 7/2008 | Tilton et al. | 310/54 |
| 7,530,156 | B2 | * | 5/2009 | Rippel et al. | 29/596 |
| 7,633,194 | B2 | | 12/2009 | Dawsey et al. | |
| 7,839,031 | B2 | * | 11/2010 | Tilton et al. | 310/54 |
| 2006/0113851 | A1 | * | 6/2006 | Ishihara et al. | 310/52 |
| 2007/0176499 | A1 | * | 8/2007 | Holmes et al. | 310/54 |

FOREIGN PATENT DOCUMENTS

CN 101232211 A 7/2008
JP 2006006047 A * 1/2006

OTHER PUBLICATIONS

Chinese Office Action, dated Mar. 15, 2012, for CN Patent Application No. 201010170006.5.

* cited by examiner

*Primary Examiner* — Quyen Leung
*Assistant Examiner* — Thomas Truong
(74) *Attorney, Agent, or Firm* — Ingrassia Fisher & Lorenz P.C.

(57) ABSTRACT

A permanent magnetic machine includes a stator body having a first end, a second end, and a plurality of generally radial slots formed therein for accepting a set of windings having a first set of end-turns at the first end and a second set of end-turns at the second end. The stator body has a plurality of channels adjacent to the slots and extending from the first end of the stator body to the second end of the stator body, wherein the channels are configured to allow the flow of a cooling fluid therethrough. A plurality of nozzles in fluid communication with the plurality of channels are configured to spray the cooling fluid onto the first and second set of end turns.

11 Claims, 3 Drawing Sheets

METHODS AND APPARATUS FOR A PERMANENT MAGNET MACHINE WITH A DIRECT LIQUID COOLED STATOR

TECHNICAL FIELD

The present invention generally relates to magnetic devices such as electrical motors, and more particularly relates to cooling methods for interior permanent magnet machines.

BACKGROUND

Permanent magnet (PM) machines are favored for fuel cell and hybrid electric vehicle operations due to their desirable characteristics—i.e., good torque density, good overall efficiency, good constant power range, etc. The rotor field in a permanent magnet machine is obtained by virtue of its structure, unlike other machines such as induction, switched or synchronous reluctance machines, in which the field is generated by a stator current supplied by a source. As a result, permanent magnet machines exhibit superior efficiency as compared to other such machines.

However, cooling of such PM machines is a significant challenge, particularly with respect to heat generated at the end turns of the windings (at opposite ends of the stator stack) and within the stator body itself. Current fluid-cooled methods incorporate the flow of some form of cooling fluid, such as water ethylene glycol (WEG), in a cooling assembly and housing that is large, inefficient, and requires complicated fixturing to interface with the stator itself.

Accordingly, it is desirable to provide improved, compact cooling systems for PM machines. Other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the invention or the application and uses of the invention. Furthermore, there is no intention to be bound by any expressed or implied theory presented in the preceding technical field, background, brief summary or the following detailed description. The invention may be described herein in terms of functional and/or logical block components and various processing steps. It should be appreciated that such block components may be realized by any number of hardware, software, and/or firmware components configured to perform the specified functions. For the purposes of conciseness, conventional techniques and systems related to electrical motors, magnetism, and the like are not described in detail herein.

In general, the various embodiments are directed to a permanent magnet machine ("PM machine") having a stator assembly incorporating cooling channels or fins within the body of the stator as well as nozzles configured to spray cooling fluid onto the winding end-turns. In this way, a compact, highly manufacturable stator assembly may be formed.

Figure 1:
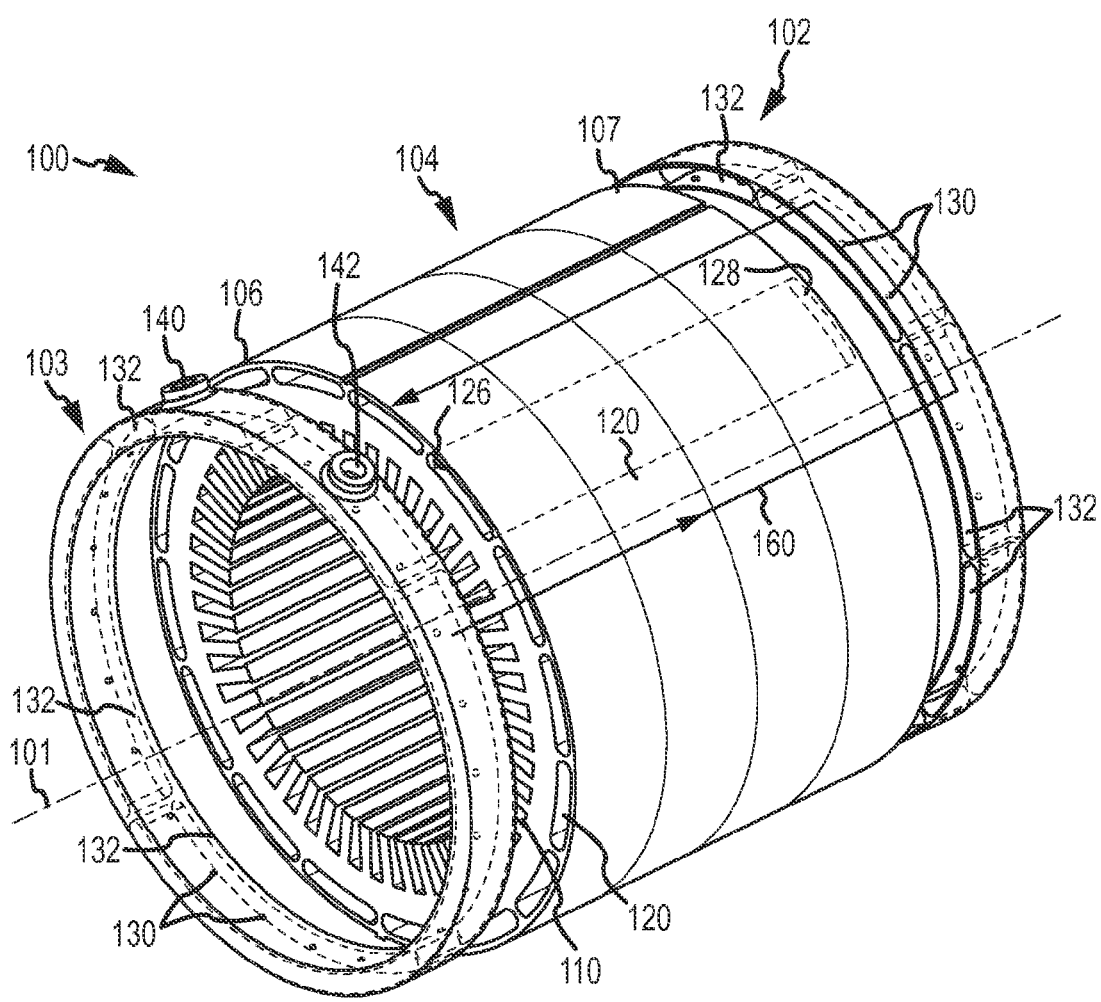
FIG. 1 is a partially-exploded, partially-transparent isometric overview of a stator assembly without windings in accordance with one embodiment.

Referring now to the exemplary embodiment shown in FIG. 1, a stator assembly 100 for a permanent magnet machine generally includes a stator body 104 having a first end 106 and a second end 107, and having a plurality of generally radial slots 110 formed therein for accepting a set of windings (not shown) having a first set of end-turns at the first end and a second set of end-turns at the second end, as is commonly known. In the context of a PM machine, a rotor would be situated coaxially within stator body 104.

Stator body 104 includes a plurality of channels 120 (or, as will be seen later, fins) adjacent to slots 110 and extending from first end 106 of stator body 104 to second end 107. Channels 120 are configured to allow the flow of a cooling fluid (e.g., a suitable oil or other liquid) therethrough. Common cooling fluids include, for example, water ethylene glycol (WEG) and automatic transmission fluid (ATF).

A plurality of nozzles 130 in fluid communication with the plurality of channels 120 are configured to spray the cooling fluid onto the first and second set of end turns (i.e., facing radially inward adjacent to slots 120).

In that regard, assembly 100 includes a first end ring 103 having a first set of ring cavities 132 provided therein and configured to house a first set of the nozzles 130, the first end ring 103 attached to the first end 106 of the stator body 104 such that the channels 120 are in fluid communication with the first set of ring cavities 132 (through openings 126 and 128). Similarly, a second end ring 102 has a second set of ring cavities 132 provided therein for housing a second set of the nozzles 130.

The first and second end rings 103 and 102 are connected to respective ends 106 and 107 of body 104 in any suitable fashion. For example, end rings 102 and 103 may be attached to stator body 104 via a bolt from end ring 102 through stator body 104 to end ring 103, by welding end rings 102 and 103 to stator body 104, or by shrinking all three 102, 103 and 104 under a common housing.

An inlet 140 is coupled to one of the first set of ring cavities 132, and an outlet 142 is coupled to one of the first or second set of ring cavities 132. Thus, the cooling fluid is configured to flow from inlet 140, through the channels 120, to the outlet 142.

The shape and layout of channels 120 may selected to achieve any desired set of design criteria. In one embodiment, for example, channels 120, the first set of ring cavities 132, and the second set of ring cavities 132 are configured such that the cooling fluid flows in a cylindrical serpentine pattern from inlet 140 to outlet 142. This is indicated by the cooling path labeled 160. Stated another way, the fluid travels axially through channels 120 within body 104 from the first end 106 to the second end 107, whereupon it enters a ring cavity 132. From that ring cavity the cooling fluid reverses direction and travels in the opposite direction to the first end 106, and so on until it reaches the outlet 142. Thus, the ring cavities 132 on each end are rotationally offset from each other by an appropriate angular amount to effect the desired back-and-forth or cylindrical serpentine motion. In this way, heat generated by the windings is transferred to the cooling fluid via conduction and forced convection.

Additional pins, microchannels, and other features may be incorporated into the cooling liquid path to increase heat transfer. While the illustrated embodiment shows channels that are longitudinal and parallel to the axis of the stator, any suitable shape and configuration may be used.

Any number of slots and channels 120 may be incorporated into body 104, depending on the particular design, and each ring 102, 103 may be separated into any number of cavities. In one embodiment, each arcuate shaped cavity within an end ring includes approximately four to eight nozzles each, which are equally spaced circumferentially and facing radially inward. The stator body may include, for example, between 10 and 20 channels.

Figure 2:
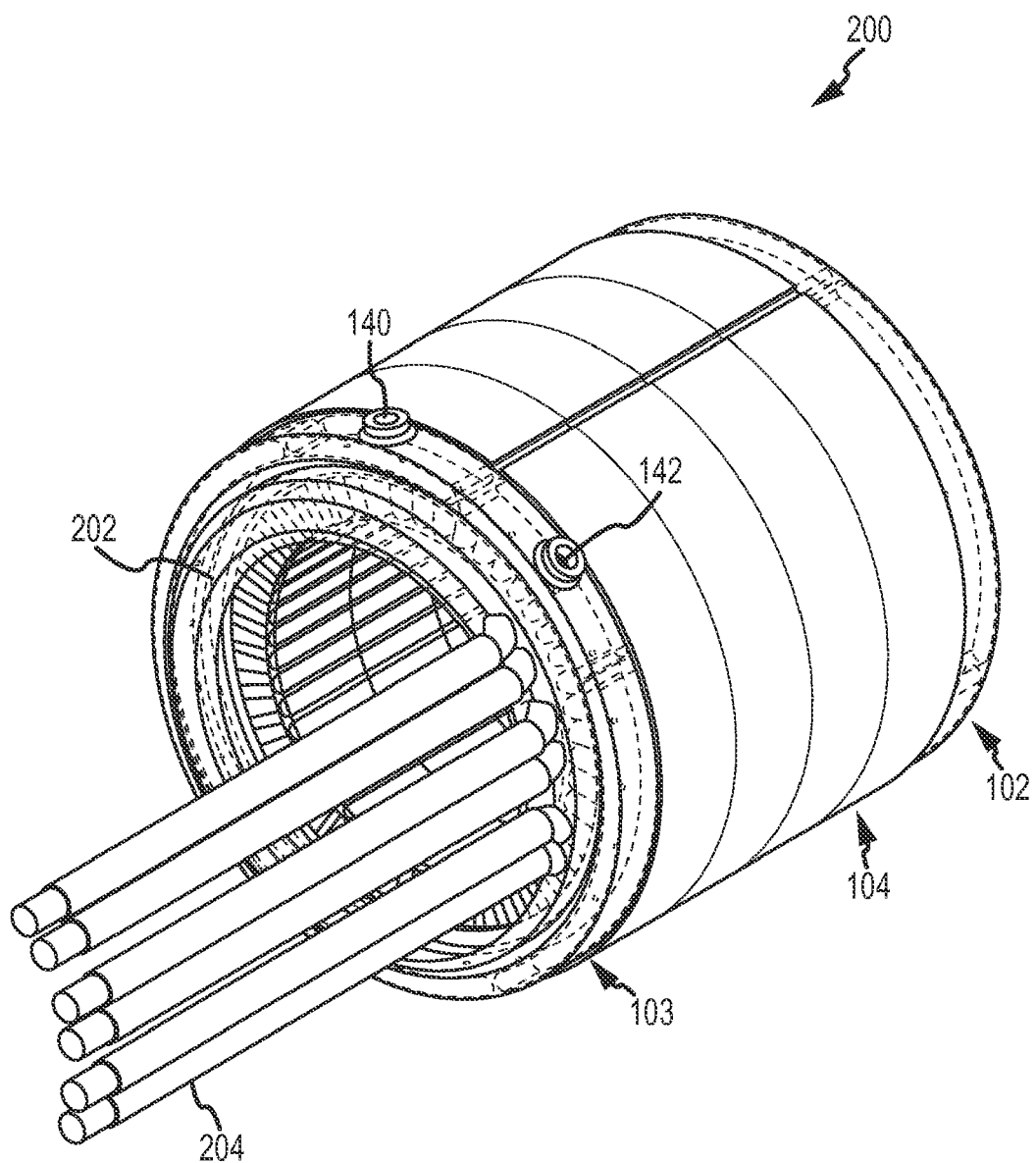
FIG. 2 is an assembled view of the complete, functional stator assembly shown in FIG. 1.

FIG. 2 depicts an assembled stator showing associated conductors 204 (coupled to the windings) as well as an end housing 202 that helps to encapsulate the end-turns and prevent the leakage of cooling fluid. Housing 202 encloses the entire end-turn windings without encapsulation. Encapsulation is preferably not used since the cooling nozzles would not be able to directly cool the end-turn windings.

Figure 3:
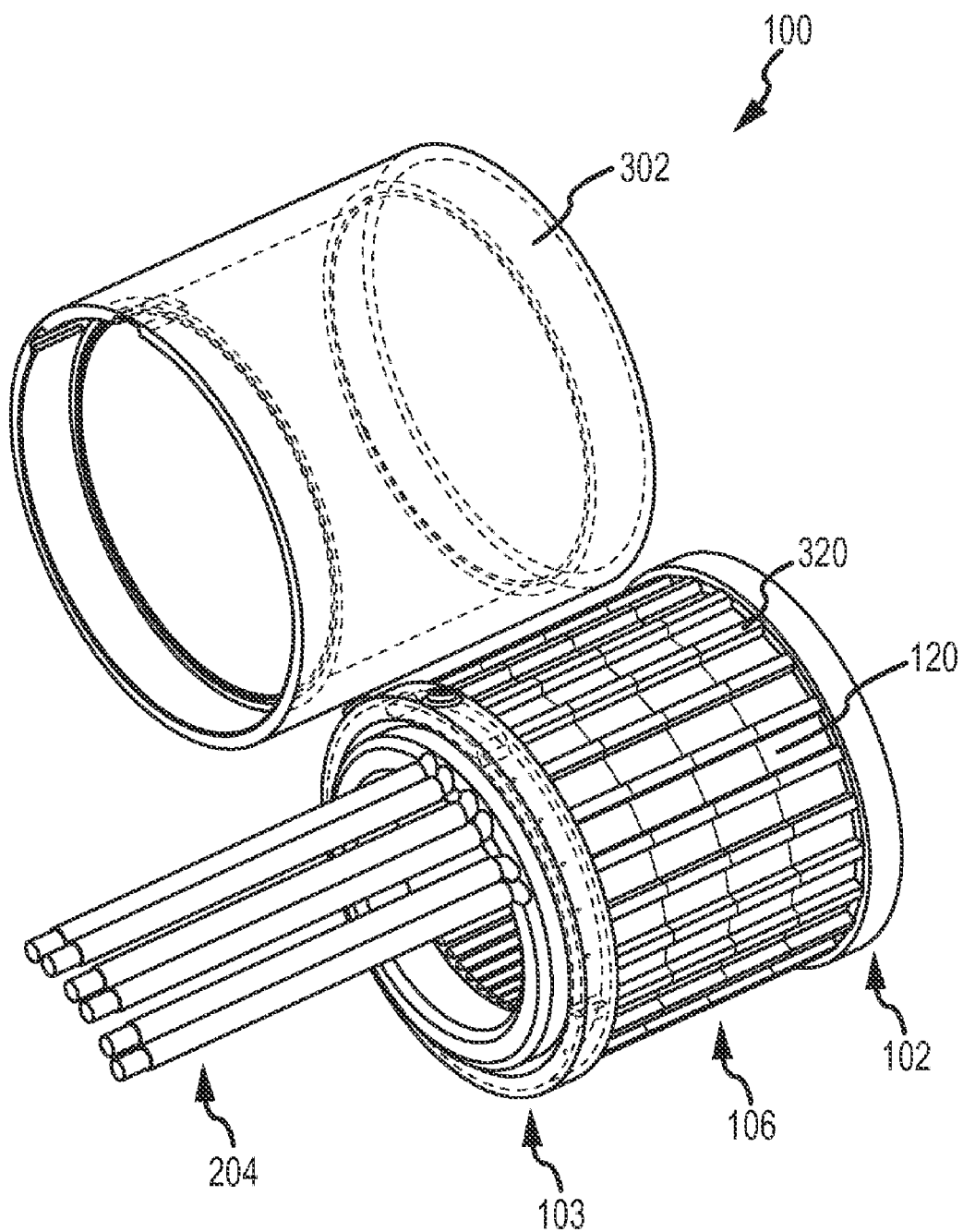
FIG. 3 is an isometric overview of a complete, functional stator assembly in accordance with an alternate embodiment.

In an alternate embodiment, shown in FIG. 3, the channels are formed such that they extend to the outer perimeter of the stator body to form a plurality of longitudinal fins 320 (adjacent to open-ended channels 120). In this embodiment, a generally cylindrical housing is attached to the outer perimeter of body 104 to restrain the flow of coolant. With respect to the embodiment shown in FIG. 1, this alternate embodiment results in an assembly 100 having reduced weight and volume.

In the first embodiment (FIG. 1), the cooling fluid is trapped internally within the stator assembly itself without requiring additional housing as in FIG. 3. However, the stator body is heavier as channels 120 are fully enclosed in order for cooling fluid to flow properly. On the other hand, this first configuration is advantageous in terms of extracting heat from the windings, as it results in a greater effective cooling surface. The second embodiment (FIG. 3) is lighter as compared to first embodiment; however, it requires a cylindrical housing to direct the cooling fluid, and has a smaller effective cooling surface.

The flow rate of the cooling liquid, the pressure at the inlet and outlet, and the nature of the cooling liquid may be selected in accordance with any desired heat-transfer capabilities.

While at least one example embodiment has been presented in the foregoing detailed description, it should be appreciated that a vast number of variations exist. For example, additional barrier layers may be incorporated in addition to the single layer illustrated. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention and the legal equivalents thereof.

What is claimed is:

1. A permanent magnet machine comprising:
    a stator body having a first end and a second end, and having a plurality of generally radial slots formed therein for accepting a set of windings having a first set of end-turns at the first end and a second set of end-turns at the second end;
    the stator body having a plurality of channels adjacent to the slots and extending from the first end of the stator body to the second end of the stator body, the channels configured to allow the flow of a cooling fluid therethrough; and
    a plurality of nozzles in fluid communication with the plurality of channels and configured to spray the cooling fluid onto the first and second set of end turns;
    a first end ring having a first set of ring cavities provided therein and configured to house a first set of the nozzles, the first end ring attached to the first end of the stator body such that the channels are in fluid communication with the first set of ring cavities;
    a second end ring having a second set of ring cavities provided therein and configured to house a second set of the nozzles, the second end ring attached to the second end of the stator body such that the channels are in fluid communication with the second set of ring cavities; and
    an inlet coupled to one of the first set of ring cavities, and an outlet coupled to one of the first or second set of ring cavities, wherein the cooling fluid is configured to flow from the inlet, through the channels, to the outlet;
    wherein the channels, the first set of ring cavities, and the second set of ring cavities are configured such that the cooling fluid may flow in a cylindrical serpentine pattern from the inlet to the outlet.

2. The permanent magnet machine of claim 1, wherein the first set of cavities includes cavities housing approximately four to eight of the first set of nozzles, and the second set of cavities includes cavities housing approximately four to eight of the second set of nozzles.

3. The permanent magnet machine of claim 1, wherein each of the first and second sets of nozzles includes nozzles spaced circumferentially and facing radially inward.

4. The permanent magnet machine of claim 1, wherein each of the first and second set of cavities are generally arcuate.

5. The permanent magnet machine of claim 1, wherein the channels are longitudinal and parallel to the axis of the stator.

6. The permanent magnet machine of claim 5, wherein the stator body includes between 10 and 20 channels.

7. The permanent magnet machine of claim 1, wherein the channels extend to the outer perimeter of the stator body to form a plurality of longitudinal fins.

8. A method for cooling a permanent magnet machine, comprising:
    providing a stator body having a plurality of channels adjacent to a plurality of winding slots and extending from a first end of the stator body to a second end of the stator body;
    providing a plurality of windings within the winding slots, the windings having a first set of end turns and second set of end turns; and
    causing a cooling fluid to flow through the channels during operation of the permanent magnet machine;
    providing a plurality of nozzles in fluid communication with the plurality of channels;
    attaching to the first end of the stator body a first end ring having a first set of ring cavities provided therein and configured to house a first set of the nozzles;
    attaching to the second end of the stator body a second end ring having a second set of ring cavities provided therein and configured to house a second set of the nozzles, such that the channels, the first set of ring cavities, and the second set of ring cavities are configured such that the cooling fluid flows in a cylindrical serpentine pattern from the inlet to the outlet; and
    spraying the cooling fluid onto the first and second set of end turns.

9. The method of claim 8, wherein the first set of cavities includes cavities housing approximately four to eight of the first set of nozzles, and the second set of cavities includes cavities housing approximately four to eight of the second set of nozzles.

10. The method of claim 8, including spacing the first and second sets of nozzles circumferentially and facing them radially inward.

11. The method of claim 8, wherein the channels are longitudinal and parallel to the axis of the stator.

* * * * *